(12) United States Patent
Pandhare et al.

(10) Patent No.: US 12,686,353 B2
(45) Date of Patent: *Jul. 21, 2026

(54) VEHICLE HAVING ANTI-TIP DEVICE

(71) Applicant: FCA US LLC, Auburn Hills, MI (US)

(72) Inventors: Ranjit Pandhare, Troy, MI (US);
Milind Parab, Troy, MI (US); **Vikas
Sanghavi**, Farmington Hills, MI (US);
Meyyappan Valliappan, Troy, MI
(US); Karthik Chitoor, South Lyon,
MI (US)

(73) Assignee: FCA US LLC, Auburn Hills, MI (US)

( * ) Notice: Subject to any disclaimer, the term of this
patent is extended or adjusted under 35
U.S.C. 154(b) by 368 days.

This patent is subject to a terminal dis-
claimer.

(21) Appl. No.: 18/482,081

(22) Filed: Oct. 6, 2023

(65) Prior Publication Data

US 2025/0115207 A1     Apr. 10, 2025

(51) Int. Cl.
B60R 21/13          (2006.01)
B62D 21/15          (2006.01)
(52) U.S. Cl.
CPC ............ B60R 21/13 (2013.01); B62D 21/152
(2013.01)
(58) Field of Classification Search
CPC ...... B60R 21/13; B60R 21/131; B62D 21/152
See application file for complete search history.

(56) References Cited

U.S. PATENT DOCUMENTS

| | | | |
|---|---|---|---|
| 8,985,258 B1 * | 3/2015 | Midoun | ............... B62D 21/152 |
| | | | 180/274 |
| 9,016,768 B2 * | 4/2015 | Makino | ............... B62D 25/082 |
| | | | 296/187.1 |
| 9,376,073 B2 | 6/2016 | Gupta et al. | |
| 10,124,831 B2 | 11/2018 | Grattan et al. | |
| 11,247,523 B2 | 2/2022 | Hammer et al. | |
| 12,441,404 B2 * | 10/2025 | Borate | ................... B62D 21/11 |
| 2014/0062129 A1 * | 3/2014 | Syed | .................... B62D 21/152 |
| | | | 296/187.1 |
| 2021/0402940 A1 | 12/2021 | Shah et al. | |
| 2024/0270315 A1 * | 8/2024 | Darin | .................. B62D 21/152 |

FOREIGN PATENT DOCUMENTS

DE        102012004682 A1     9/2013

* cited by examiner

*Primary Examiner* — Faye M Fleming
(74) *Attorney, Agent, or Firm* — Jeremy J. Klobucar

(57)          ABSTRACT

A vehicle including a vehicle frame, a wheel attached to the
vehicle frame, and an anti-tip device attached to the vehicle
frame. The anti-tip device includes a deflector assembly
having a deflector section that extends angularly outward
from the vehicle frame and a tail section unitary with
deflector section that extends along and in parallel with a
length of the vehicle frame, and the anti-tip device is
configured, in the event of an offset frontal impact to the
vehicle that forces the wheel in a direction toward the
vehicle frame, to be struck by the wheel and deflect the
wheel in a direction away from the vehicle frame to prevent
the wheel from travelling beneath the vehicle frame.

14 Claims, 7 Drawing Sheets

VEHICLE HAVING ANTI-TIP DEVICE

FIELD

The present disclosure relates to a vehicle having an anti-tip device.

BACKGROUND

This section provides background information related to the present disclosure which is not necessarily prior art.

In the event of a frontal offset collision with another vehicle, barrier, or some other type of object, the force of the collision may sometimes cause components of the vehicle such as the vehicle suspension and/or wheel to under-ride the vehicle and become trapped between the underbody or frame of the vehicle and the road. In such a case, the component trapped between the underbody or frame of the vehicle and the road may cause the vehicle to roll over or at least partially roll over.

SUMMARY

This section provides a general summary of the disclosure and is not a comprehensive disclosure of its full scope or all of its features.

According to a first aspect of the present disclosure, there is provided a vehicle including a vehicle frame, a wheel attached to the vehicle frame, and an anti-tip device attached to the vehicle frame. The anti-tip device includes a deflector assembly having a deflector section that extends angularly outward from the vehicle frame and a tail section unitary with deflector section that extends along and in parallel with a length of the vehicle frame, and the anti-tip device is configured, in the event of an offset frontal impact to the vehicle that forces the wheel in a direction toward the vehicle frame, to be struck by the wheel and deflect the wheel in a direction away from the vehicle frame to prevent the wheel from travelling beneath the vehicle frame.

According to the first aspect, the anti-tip device further comprises a reinforcement assembly including a first plate, a second plate, and a third plate positioned between the vehicle frame and the deflector section, the reinforcement assembly configured to provide structural support to the deflector section when the deflector plate is struck by the wheel.

According to the first aspect, the second plate is positioned between the first plate and the second plate, and includes a planar member having curled opposing ends that define hollow cylinders configured for receipt of a pair of fasteners that secure the deflector section and the reinforcement assembly to the vehicle frame.

According to the first aspect, the anti-tip device further comprises a first reinforcement panel and a second reinforcement panel positioned between the tail section and the vehicle frame.

According to the first aspect, the first and second reinforcement panels each include a C-shaped panel having a surface that abuts an interior surface of the tail section and a pair of side panels that extend outward from the surface to define the C-shape.

According to the first aspect, one of the side panels includes a connection flange that is configured to connect the first and second reinforcement panels to the vehicle frame.

According to the first aspect, the deflector assembly and each of the reinforcement assembly and the first and second reinforcement panels are formed of a rigid metal material.

According to a second aspect of the present disclosure, there is provided a vehicle including a vehicle frame including a first rail and a second rail; a plurality of wheels attached to the vehicle frame; and a first anti-tip device attached to the first rail and a second anti-tip device attached to the second rail, wherein each of the anti-tip devices includes a deflector assembly having a deflector section that extends angularly outward from a respective rail of the vehicle frame and a tail section unitary with deflector section that extends along and in parallel with a length of the respective rail of the vehicle frame, and the anti-tip devices are configured, in the event of an offset frontal impact to the vehicle that forces the wheel in a direction toward at least one of the first and second rails of the vehicle frame, to be struck by the wheel and deflect the wheel in a direction away from the vehicle frame to prevent the wheel from travelling beneath the vehicle frame.

According to the second aspect, the anti-tip devices each further comprise a reinforcement assembly including a first plate, a second plate, and a third plate positioned between the respective rail of the vehicle frame and the deflector section, the reinforcement assembly configured to provide structural support to the deflector section when the deflector plate is struck by the wheel.

According to the second aspect, the second plate is positioned between the first plate and the second plate, and includes a planar member having curled opposing ends that define hollow cylinders configured for receipt of a pair of fasteners that secure the deflector section and the reinforcement assembly to the respective rail of the vehicle frame.

According to the second aspect, the anti-tip devices each further comprise a first reinforcement panel and a second reinforcement panel positioned between the tail section and the respective rail of the vehicle frame.

According to the second aspect, the first and second reinforcement panels each include a C-shaped panel having a surface that abuts an interior surface of the tail section and a pair of side panels that extend outward from the surface to define the C-shape.

According to the second aspect, one of the side panels includes a connection flange that is configured to connect the first and second reinforcement panels to the respective rail of the vehicle frame.

According to the second aspect, the deflector assembly and each of the reinforcement assembly and the first and second reinforcement panels are formed of a rigid metal material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
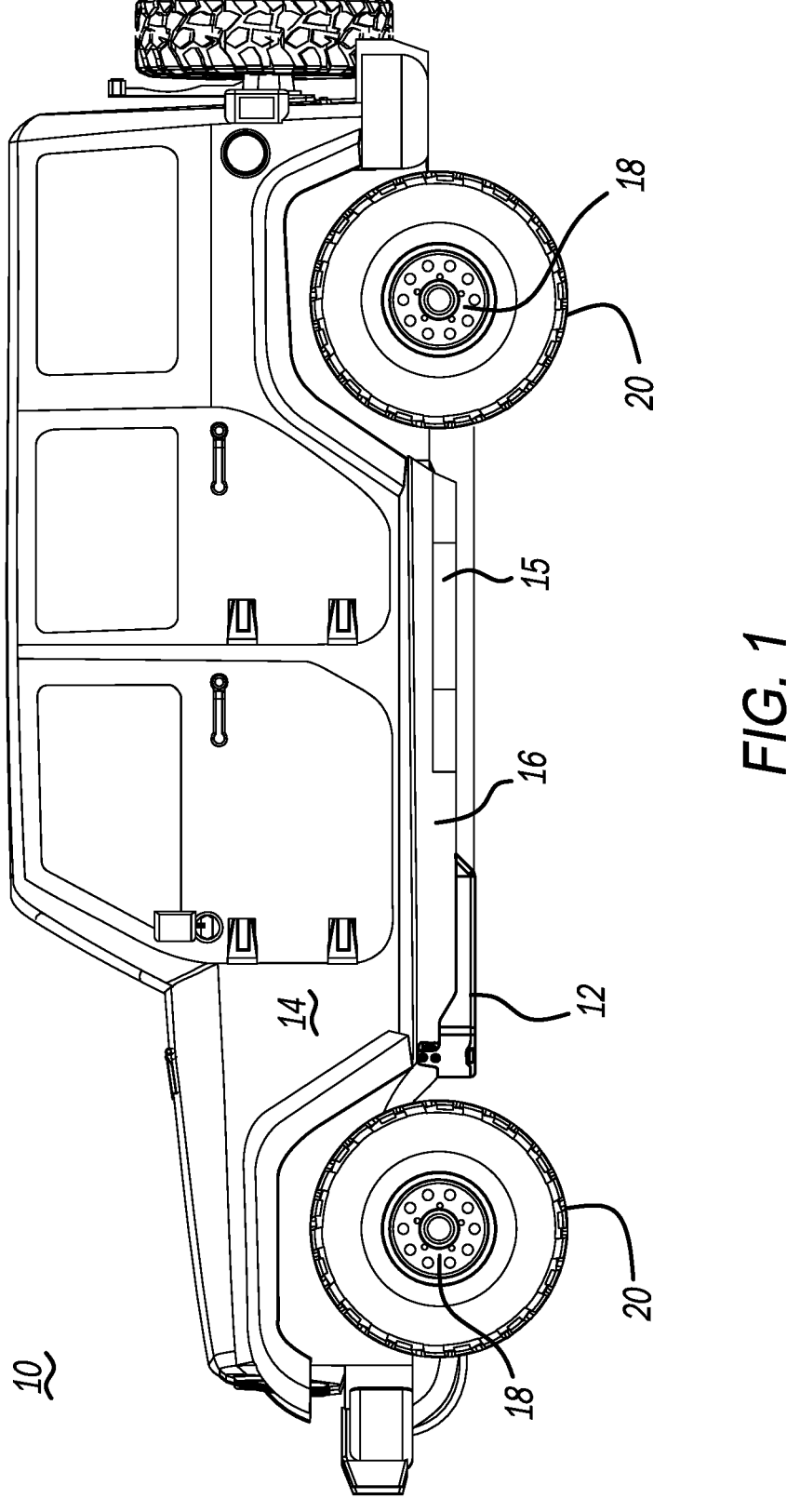
FIG. 1 is a side-perspective view of a vehicle including an anti-tip device according to a principle of the present disclosure.
Figure 2:
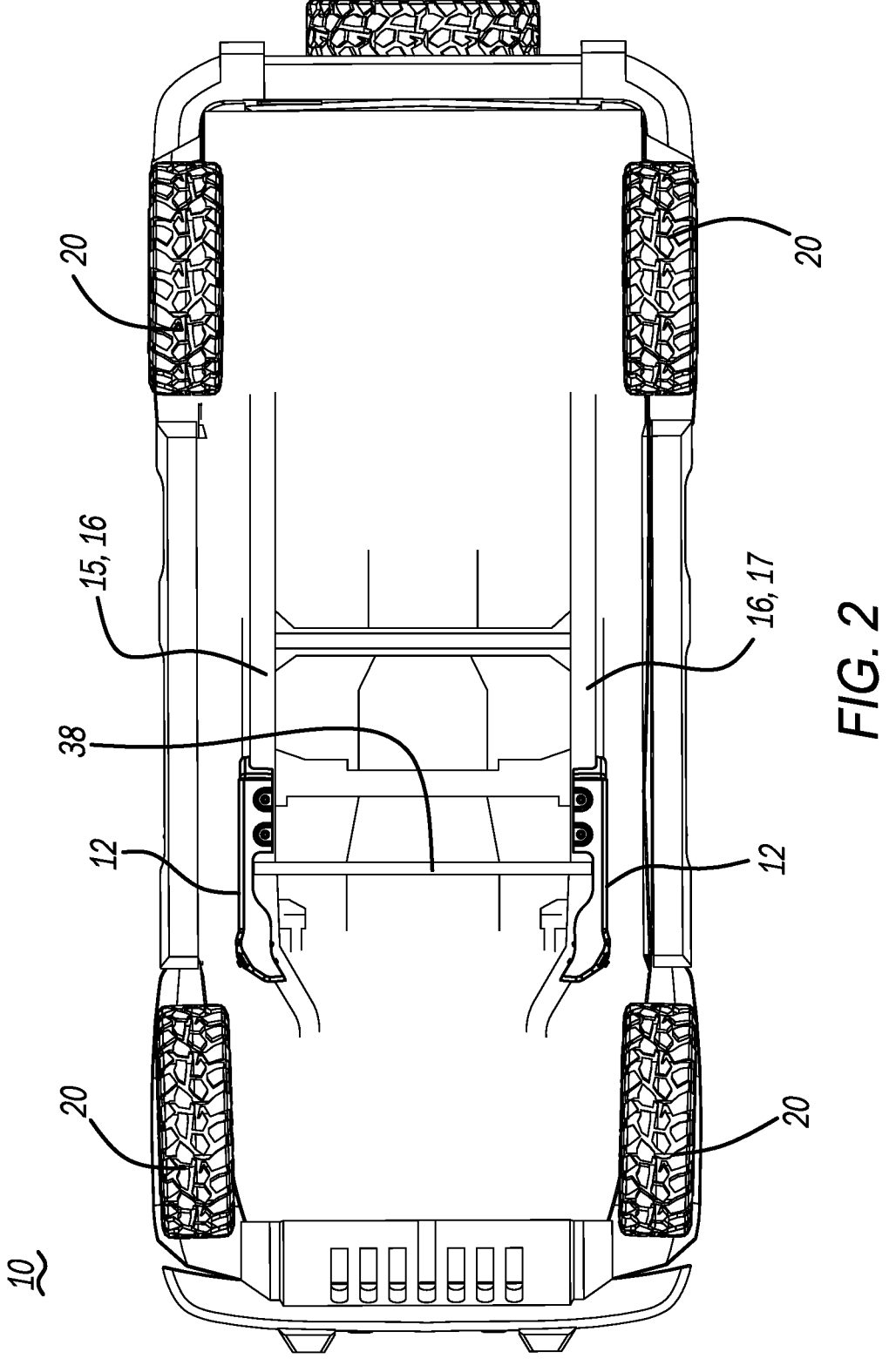
FIG. 2 is a bottom-perspective view of the vehicle including the anti-tip device illustrated in FIG. 1.
Figure 3:
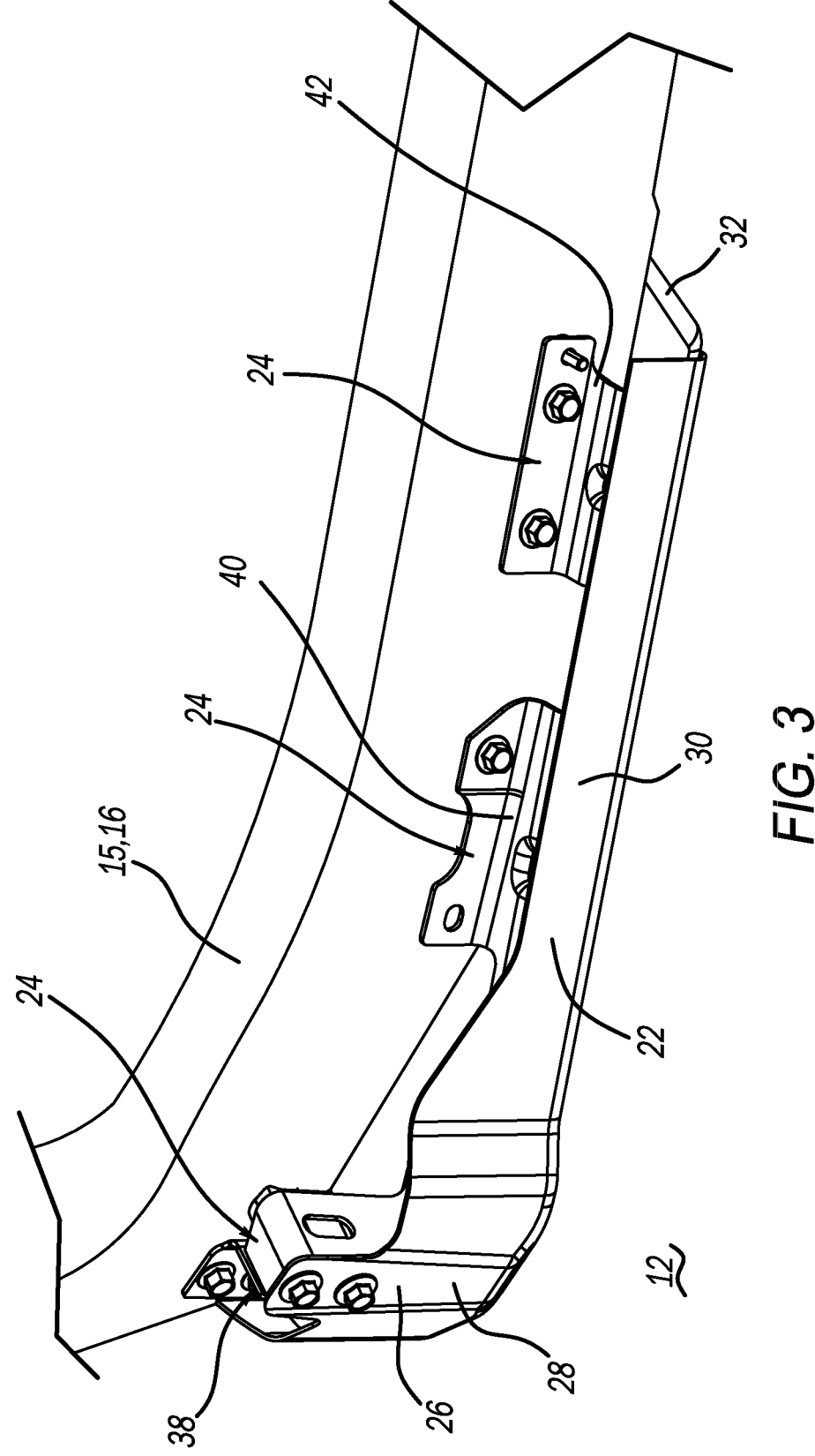
FIG. 3 is a perspective view of the anti-tip device illustrated in FIGS. 1 and 2.
Figure 4:
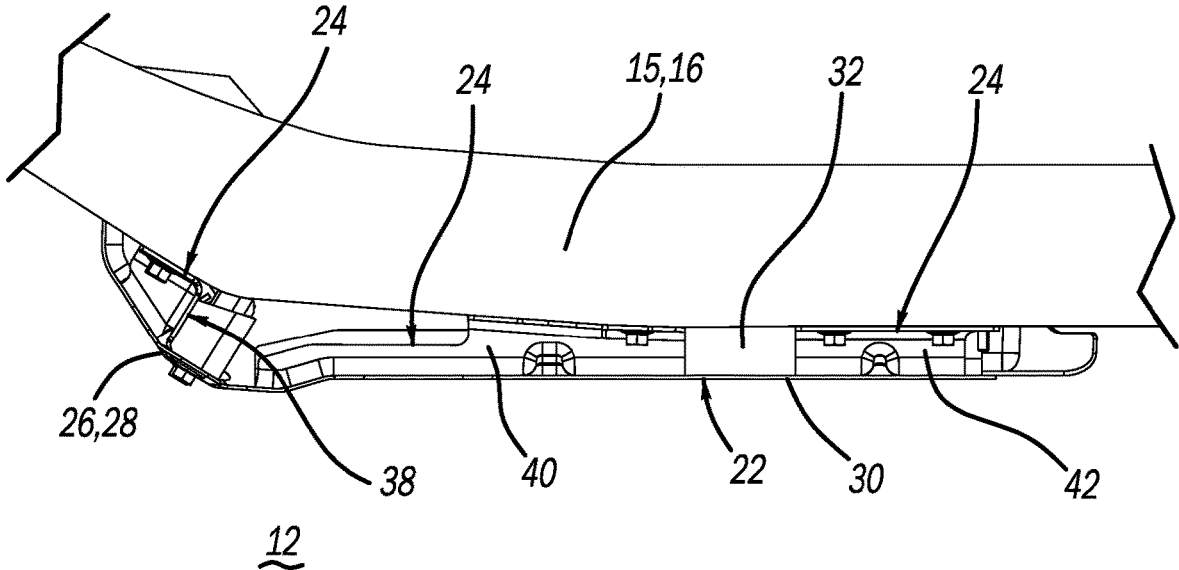
FIG. 4 is a top-perspective view of the anti-tip device illustrated in FIG. 3.
Figure 5:
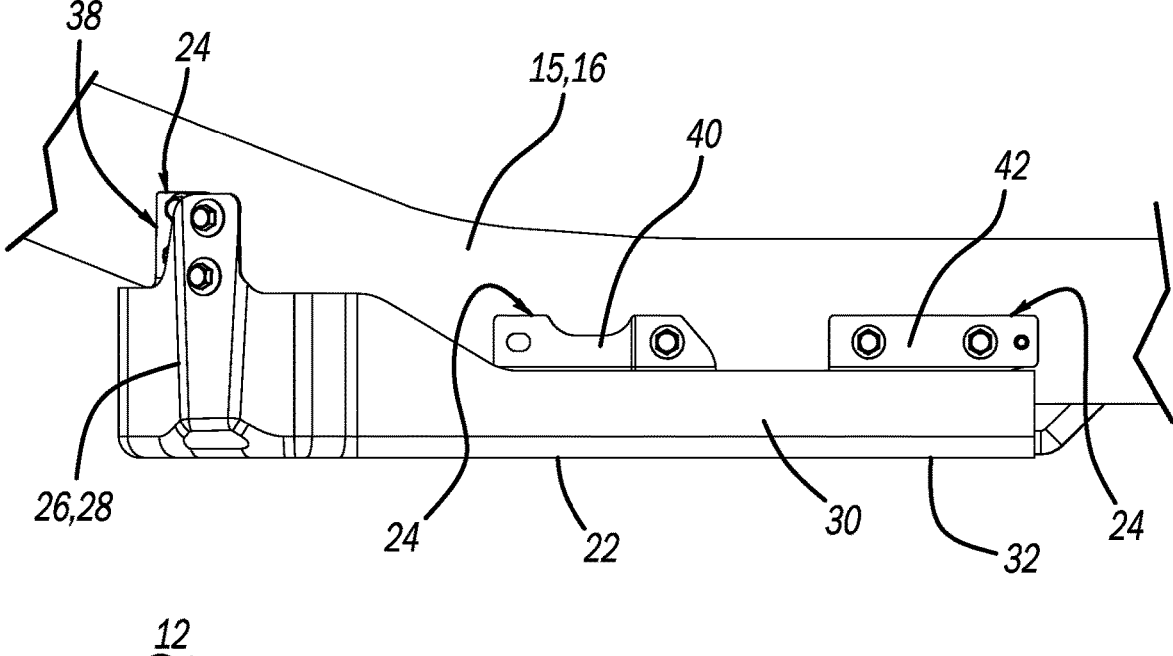
FIG. 5 is a side-perspective view of the anti-tip device illustrated in FIG. 3.

FIGS. 1 and 2 illustrate a vehicle 10 having a pair of anti-tip devices 12 according to a principle of the present disclosure. Vehicle 10 includes a body 14 attached to a frame 16 having a first rail 15 and a second rail 17, and a plurality of wheels 18 including tires 20. Wheels 18 including tires 20 may be attached to vehicle 10 in a conventional manner known by those skilled in the art. As will be described in more detail below, in the event of a small overlap offset frontal impact with another vehicle, barrier, or some other type of object, the force of the impact may force wheel 18 and/or tire 20 in a direction back toward the anti-tip device 12, which can deflect the wheel and/or tire 20 in a direction away from vehicle 10 such that the wheel and/or tire does not travel beneath the frame 16. By preventing the wheel and/or tire 20 from traveling beneath the frame 16 (i.e., under-riding the frame 16), the wheel and/or tire 20 cannot lift the vehicle 10 and potentially cause it to roll over.

Now referring to FIGS. 3-8, the anti-tip devices 12 will be described in more detail. The primary components of anti-tip devices 12 include a deflector assembly 22 having a plurality of reinforcement members 24 that increase the rigidity of deflector assembly 22 in the event of an impact to vehicle 10 where wheel 18 and/or tire 20 as well as other components of the vehicle 10 (e.g., suspension components, steering knuckles, and the like) are forced in a direction into contact with anti-tip device 12. Each of these components will now be described in more detail.

Deflector assembly 22 may include components formed of a rigid material such as a metal material. Example metal materials include steel, aluminum, titanium, or any other metal material or alloy known to one skilled in the art. In the illustrated embodiment, deflector assembly 22 includes a deflector section 26 that is an angled plate 28 configured to deflect the wheel 18 and/or tire 20 away from vehicle 10 in the event of an impact by the wheel 18 and/or tire (or any other component of vehicle 10) to deflector section 26. Deflector assembly 22 includes a longitudinally extending tail section 30 unitary with deflector section 26 that extends along a length of frame 16. Tail section 30 provides increased rigidity to deflector assembly 22.

More particularly, if vehicle 10 collides with an object or barrier at velocities in excess of, for example, forty miles per hour and the wheel 18 and/or tire 20 is forced back and collides with deflector assembly 22, the initial force applied to deflector section 26 could potentially cause deflector section 26 to deform in a direction toward frame 16 and lessen the efficacy of deflector section 26 in deflecting the wheel 18 and/or tire 20 away from vehicle 10. Put another way, in the event of a substantial impact to deflector section 26, the energy is transferred along tail section 30 that is rigidly attached to frame 16 by reinforcement members 24, which assists in preventing deflector section 26 from deforming to an extent that would potentially permit wheel 18 and/or tire 20 from under-riding frame 16.

Figure 6:
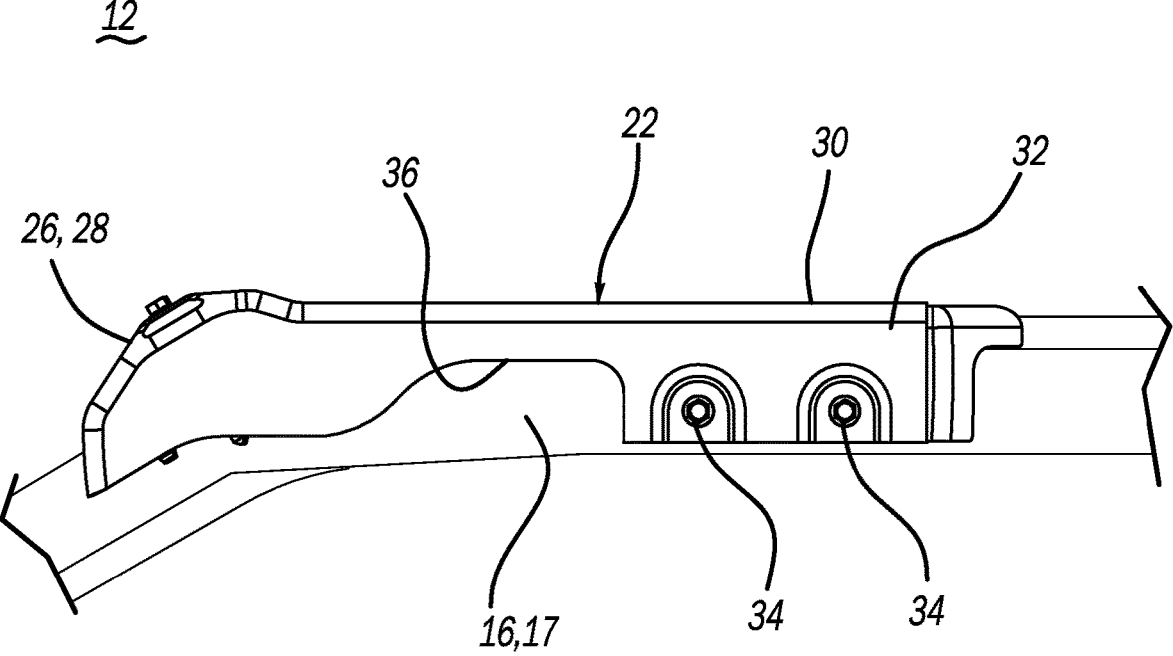
FIG. 6 is a bottom-perspective view of the anti-tip device illustrated in FIG. 3.

Deflector assembly 22 also includes a longitudinally extending flange 32 that extends orthogonally outward from each of deflector section 26 and tail section 30. As best shown in FIG. 6, flange 32 includes through-holes configured for receipt of fasteners 34 that rigidly attach deflector assembly 22 to frame 16. While flange 32 is illustrated in FIG. 6 as including a notch 36, which is present to account for a cross-member 38 that interconnects the frame members 16 located on each side of vehicle 10 (see, e.g., FIG. 2), it should be understood that notch 36 is not required.

Reinforcement members 24 include a reinforcement assembly 38, a first reinforcement panel 40, and a second reinforcement panel 42. Reinforcement assembly 38 is positioned between deflector section 26 and frame 16, first reinforcement panel 40 is positioned between tail section 30 and frame 16, and second reinforcement panel 42 is positioned between tail section 30 and frame 16, with first reinforcement panel 40 being positioned between reinforcement assembly 38 and second reinforcement panel 42. Reinforcement members 24 provide increased rigidity to anti-tip device 12.

Figure 7:
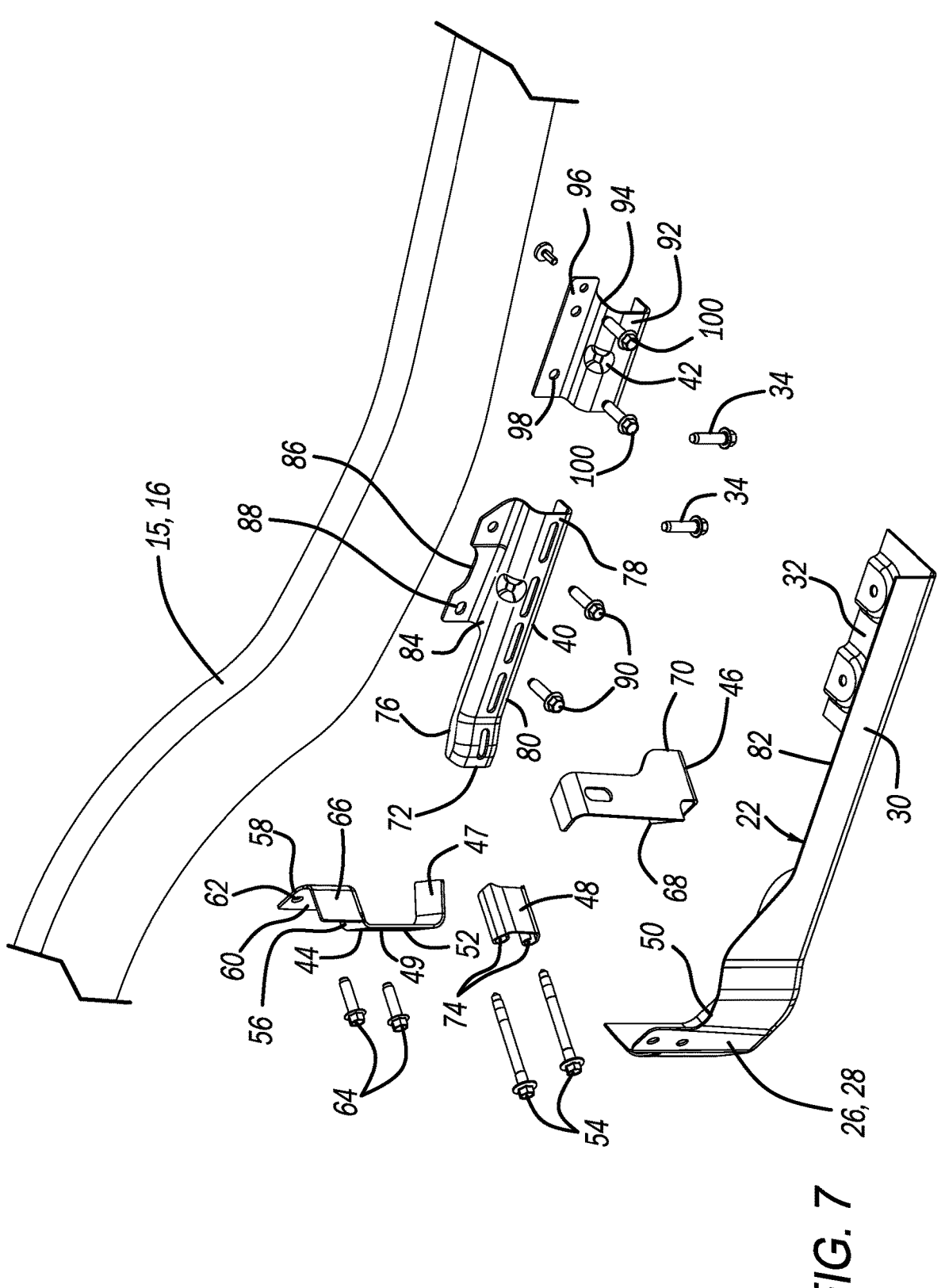
FIG. 7 is an exploded perspective view of the anti-tip device illustrated in FIG. 2.
Figure 8:
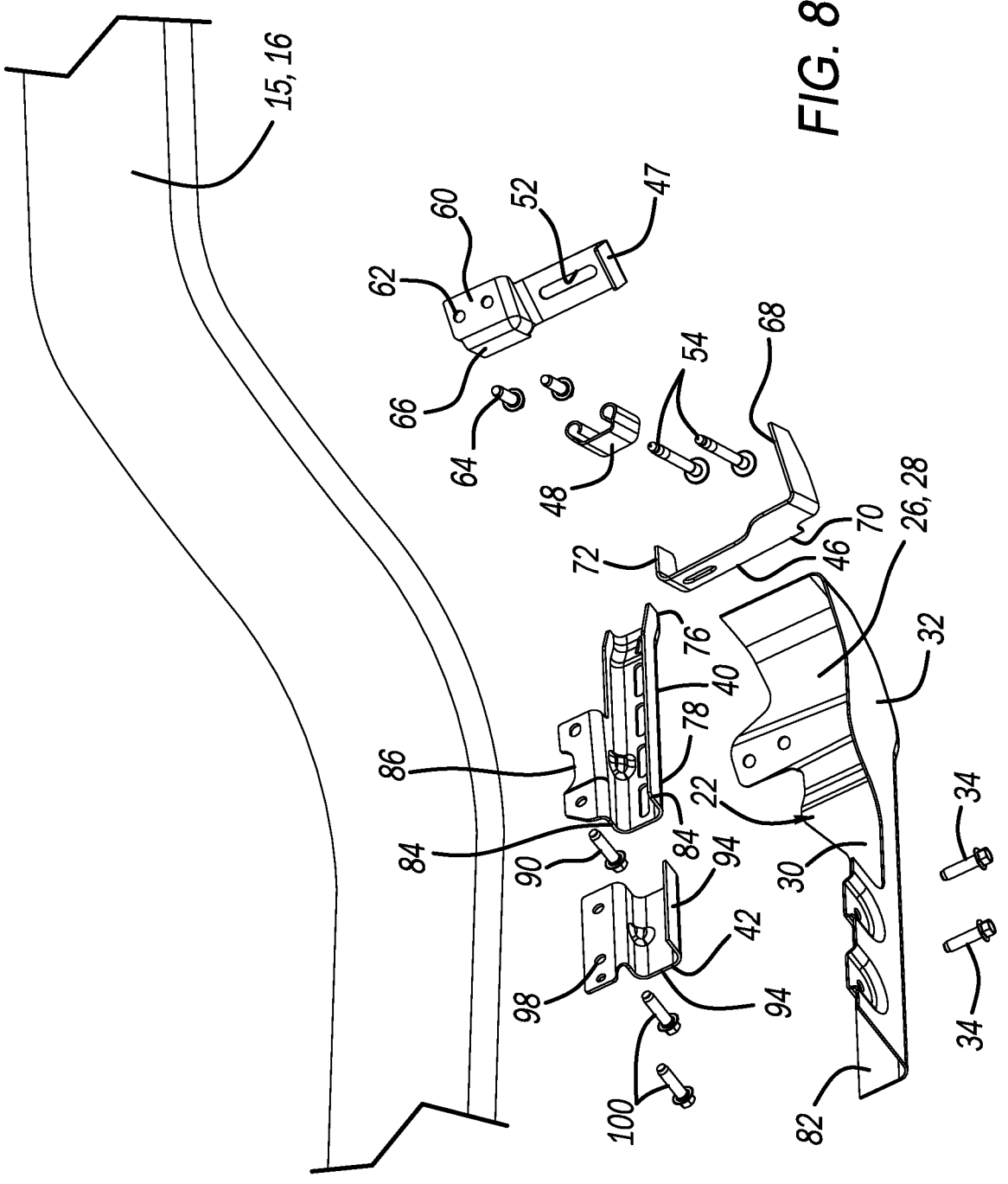
FIG. 8 is another exploded perspective view of the anti-tip device illustrated in FIG. 2.

As best shown in FIGS. 7 and 8, reinforcement assembly 38 includes a first plate 44, a second plate 46, and a third plate 48. First plate 44 is a monolithic member that includes a first outwardly extending lip portion 47 configured to lie overtop flange 32. An upwardly extending portion 49 extends upward from first lip portion 47 and is configured to abut an interior surface 50 of deflector section 26. Upwardly extending portion 49 may include an elongated slot 52 (FIG. 8) configured for receipt of fasteners 54 for rigidly securing deflector assembly 22 and reinforcement assembly 38 to frame 16. A second outwardly extending lip portion 56 is attached to upwardly extending portion 49 and includes an L-shaped bracket portion 58 that is connected to second lip portion 56. L-shaped bracket 58 includes a first leg 60 that is configured to abut against frame 16 that includes a pair of apertures 62 configured for receipt of fasteners 64 that rigidly attach first leg 58 to frame 16. L-shaped bracket 58 also includes a second leg 66 that is configured to abut against second plate 46. Similar to deflector assembly 22, first plate 44 may be formed of a rigid metal material such as steel.

Second plate 46 may be a C-shaped plate including a first planar projection 68 that is configured to be positioned between flange 32 and first lip portion 47. An upstanding planar beam 70 extends upward from first planar projection 68. A second planar projection 72 extends outward from upstanding planar beam 70 and is configured to lie overtop L-shaped bracket 58. Second planar projection 72 may be slightly angled in a direction toward first planar projection 68 such that second planar projection 72 may act as a seat for third plate 48. Similar to deflector assembly 22, second plate 46 may be formed of a rigid metal material such as steel.

Third plate 48 is configured to be positioned between first plate 44 and second plate 46. In the illustrated embodiment, third plate 48 is a planar member having a pair of curled ends 74 that define hollow cylinders that are configured for receipt of fasteners 54. Third plate 48 provides increased structural rigidity for preventing fasteners 54 from being sheared during an impact event to anti-tip device 12, as well as increased structural rigidity to the reinforcement assembly 38 as a whole. Similar to deflector assembly 22, third plate 48 may be formed of a rigid metal material such as steel.

First reinforcement panel 40 is an elongated C-shaped panel having a proximate end 76 that is positioned proximate an end of tail section 30 located near reinforcement assembly 38 and a distal end 78 located proximate a center of tail section 30. Proximate end 76 may be slightly curved to account for a transition between deflector member 26 and tail section 30. A primary surface 80 of first reinforcement panel 40 is configured to abut an interior surface 82 of tail section 30. Side panels 84 extend outward from primary surface 80 to define the C-shape of first reinforcement panel 40. A connection flange 86 may extend outward from one of the side panels 84 that includes apertures 88 configured for receipt of fasteners 90 that rigidly connect first reinforcement panel 40 to frame 16. Similar to deflector assembly 22, first reinforcement panel 40 may be formed of a rigid metal material such as steel.

Second reinforcement panel 42 is similar to first reinforcement panel 40. That is, as can be seen in FIGS. 7 and 8, second reinforcement panel 52 is a C-shaped panel having a principal surface 92 that is configured to abut interior surface 82 of tail section 30. Side panels 94 extend outward from principal surface 92 to define the C-shape of second reinforcement panel 42. A connection flange 96 may extend outward from one of the side panels 94 that includes apertures 98 configured for receipt of fasteners 100 that rigidly connect second reinforcement panel 42 to frame 16. Similar to deflector assembly 22, second reinforcement panel 42 may be formed of a rigid metal material such as steel.

Now operation of anti-tip device 12 will be described relative to when vehicle 10 is subjected to a small overlap rigid barrier (SORB) collision test. While operation of anti-tip device 12 will be described relative to a collision with a rigid barrier in a controlled environment, it should be understood that anti-tip device 12 will also function in a similar manner in the event of a collision with another vehicle or some other type of object. When vehicle 10 collides with the barrier (not shown), the force of the impact may be to an extent that the barrier contacts the wheel 18 and/or tire 20 of the vehicle 10. Contact between the wheel 18 and/or tire 20 with the barrier may cause the wheel 18 and/or tire 20 to travel in a direction back toward the vehicle frame 16. If vehicle 10 is not equipped with anti-tip device 12, the wheel 18 and/or tire 20 may travel beneath frame 16 and cause the front end of the vehicle 10 to lift upwards away from the ground, which is undesirable.

Anti-tip device 12 assists in preventing the wheel 18 and/or tire 20 from travelling beneath frame 16. In this regard, as the wheel 18 and/or tire 20 travel in a direction back toward frame 16, the wheel 18 and/or tire 20 will first strike deflector section 26. Because deflector section 26 extends away from frame 16 at an angle, the wheel 18 and/or tire 20 will be deflected by the deflector section 26, which is reinforced by at least reinforcement assembly 38, in a direction away from frame 16 to assist in preventing the wheel 18 and/or tire 20 from travelling beneath frame 16. This deflection of the wheel 18 and/or tire 20 away from frame 16 prevents the front of the vehicle 10 from lifting upwards and away from the ground, which can reduce the risk that vehicle 10 rolls over after collision with the barrier or other object.

Further, if the force of the collision between the barrier or object is significant, it should be understood that the rigidity provided by reinforcement assembly 38 that is comprised of first, second, and third plates 44, 46, and 48 assists in preventing or at least substantially minimizing deformation of deflector section 26 such that the wheel 18 and/or tire 20 is deflected away from frame 16 and prevented from under-riding frame 16. Moreover, even if the force of the collision between wheel 18 and/or tire 20 is of an extent that deflector section 26 may be deformed, tail section 30 that is rigidly attached to frame 16 by the first and second reinforcement panels 40 and 42 is configured to have the force transferred thereto without detaching from vehicle frame 16. Thus, the configuration of anti-tip device 12 is more robust and able to better prevent wheel 18 and/or tire 20 from under-riding frame 16 and potentially causing vehicle 10 to tip.

It should be understood that anti-tip device 12, while able to assist in preventing the wheel 18 and/or tire 20 from travelling in a direction toward body 14 of the vehicle (at least to an extent), is not specifically designed to assist in preventing the wheel and/or tire 20 from travelling in a direction toward a cabin of the vehicle 10. In contrast, anti-tip device 12 is designed to assist in preventing the wheel 18 and/or tire 20 from travelling beneath the frame 16 and preventing a roll over incident. Thus, anti-tip device 12 is designed to be attached to frame 16 in a manner that is as close to the ground beneath the vehicle 10 as possible so as to further inhibit wheel 18 and/or tire 20 from travelling beneath frame 16.

Lastly, as noted above, it should be understood that anti-tip device 12 is designed to be more rigidly connected to frame 16 due to the tail section 30, and the use of the second and third reinforcement panels 40 and 42 between the tail section 30 and the frame 16. This design is advantageous from the standpoint that it is not uncommon for a particular model of vehicle 10 to have different variations where, for example, one variation of the vehicle 10 has more mass, uses a different wheel or tire size (i.e., larger ties), and has different (i.e., greater mass) suspensions components to account for the increased mass of vehicle 10 and/or larger wheel and tire sizes. By reinforcing deflector assembly 22 with tail section 30 and the first and second reinforcement panels 40 and 42, anti-tip device 12 is able to withstand being struck by larger wheels 18, tires 20, or other components of the vehicle 10 such as steering knuckles, suspension components, and the like without being damaged to an extent that these components are able to under-ride vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a vehicle frame;

a wheel attached to the vehicle frame; and an anti-tip device attached to the vehicle frame, wherein the anti-tip device includes a deflector assembly having a deflector section that extends angularly outward from the vehicle frame and a tail section unitary with deflector section that extends along and in parallel with a length of the vehicle frame, and the anti-tip device is configured, in the event of an offset frontal impact to the vehicle that forces the wheel in a direction toward the vehicle frame, to be struck by the wheel and deflect the wheel in a direction away from the vehicle frame to prevent the wheel from travelling beneath the vehicle frame.

2. The vehicle according to claim 1, wherein the anti-tip device further comprises a reinforcement assembly including a first plate, a second plate, and a third plate positioned between the vehicle frame and the deflector section, the reinforcement assembly configured to provide structural support to the deflector section when the deflector plate is struck by the wheel.

3. The vehicle according to claim 2, wherein the second plate is positioned between the first plate and the second plate and includes a planar member having curled opposing ends that define hollow cylinders configured for receipt of a pair of fasteners that secure the deflector section and the reinforcement assembly to the vehicle frame.

4. The vehicle according to claim 2, wherein the anti-tip device further comprises a first reinforcement panel and a second reinforcement panel positioned between the tail section and the vehicle frame.

5. The vehicle according to claim 4, wherein the first and second reinforcement panels each include a C-shaped panel having a surface that abuts an interior surface of the tail section and a pair of side panels that extend outward from the surface to define the C-shape.

6. The vehicle according to claim 5, wherein one of the side panels includes a connection flange that is configured to connect the first and second reinforcement panels to the vehicle frame.

7. The vehicle according to claim 4, wherein the deflector assembly and each of the reinforcement assembly and the first and second reinforcement panels are formed of a rigid metal material.

8. A vehicle comprising:

a vehicle frame including a first rail and a second rail;

a plurality of wheels attached to the vehicle frame; and a first anti-tip device attached to the first rail and a second anti-tip device attached to the second rail, wherein each of the anti-tip devices includes a deflector assembly having a deflector section that extends angularly outward from a respective rail of the vehicle frame and a tail section unitary with deflector section that extends along and in parallel with a length of the respective rail of the vehicle frame, and the anti-tip devices are configured, in the event of an offset frontal impact to the vehicle that forces the wheel in a direction toward at least one of the first and second rails of the vehicle frame, to be struck by the wheel and deflect the wheel in a direction away from the vehicle frame to prevent the wheel from travelling beneath the vehicle frame.

9. The vehicle according to claim 8, wherein the anti-tip devices each further comprise a reinforcement assembly including a first plate, a second plate, and a third plate positioned between the respective rail of the vehicle frame and the deflector section, the reinforcement assembly configured to provide structural support to the deflector section when the deflector plate is struck by the wheel.

10. The vehicle according to claim 9, wherein the second plate is positioned between the first plate and the second plate and includes a planar member having curled opposing ends that define hollow cylinders configured for receipt of a pair of fasteners that secure the deflector section and the reinforcement assembly to the respective rail of the vehicle frame.

11. The vehicle according to claim 9, wherein the anti-tip devices each further comprise a first reinforcement panel and a second reinforcement panel positioned between the tail section and the respective rail of the vehicle frame.

12. The vehicle according to claim 11, wherein the first and second reinforcement panels each include a C-shaped panel having a surface that abuts an interior surface of the tail section and a pair of side panels that extend outward from the surface to define the C-shape.

13. The vehicle according to claim 12, wherein one of the side panels includes a connection flange that is configured to connect the first and second reinforcement panels to the respective rail of the vehicle frame.

14. The vehicle according to claim 11, wherein the deflector assembly and each of the reinforcement assembly and the first and second reinforcement panels are formed of a rigid metal material.

* * * * *